(12) United States Patent
Reul et al.

(10) Patent No.: US 10,124,770 B2
(45) Date of Patent: Nov. 13, 2018

(54) TRANSPARENT PANE WITH AN ELECTRICAL HEATING LAYER, AND PRODUCTION PROCESS THEREFOR

(75) Inventors: Bernhard Reul, Herzogenrath (DE); Susanne Lisinski, Cologne (DE); Guenther Schall, Kreuzau (DE); Sabine Velden, Inden (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 711 days.

(21) Appl. No.: 13/983,046

(22) PCT Filed: Feb. 8, 2012

(86) PCT No.: PCT/EP2012/052141
§ 371 (c)(1),
(2), (4) Date: Oct. 16, 2013

(87) PCT Pub. No.: WO2012/110381
PCT Pub. Date: Aug. 23, 2012

(65) Prior Publication Data
US 2014/0027434 A1 Jan. 30, 2014

(30) Foreign Application Priority Data
Feb. 16, 2011 (EP) .................................... 11154735

(51) Int. Cl.
*B60L 1/02* (2006.01)
*H05B 3/00* (2006.01)
(Continued)

(52) U.S. Cl.
CPC .............. *B60S 1/026* (2013.01); *H01C 17/02* (2013.01); *H05B 3/84* (2013.01);
(Continued)

(58) Field of Classification Search
CPC ... B60S 1/026; H01C 17/02; H05B 2203/013; H05B 2203/016; H05B 3/84; Y10T 29/49083; Y10T 29/49087
(Continued)

(56) References Cited

U.S. PATENT DOCUMENTS 3,895,433 A * 7/1975 Gruss ................ B32B 17/10036
156/102
5,089,687 A 2/1992 Bartrug et al.
(Continued)

FOREIGN PATENT DOCUMENTS

DE 101 36 549 A1 2/2003
DE 10 2007 008833 A1 8/2008
(Continued)

OTHER PUBLICATIONS

PCT Written Opinion dated May 15, 2012 for PCT/EP2012/052141 filed Feb. 8, 2012 in the name of Saint-Gobain Glass France (German & English Translation).
(Continued)

*Primary Examiner* — Dana Ross
*Assistant Examiner* — Ket D Dang
(74) *Attorney, Agent, or Firm* — Steinfl + Bruno LLP

(57) ABSTRACT

A transparent pane with an electrical heating layer extends at least over a part of the pane surface and can be electrically connected to a power source. The transparent pane is electrically connected through a strip-shaped first bus bar and a strip-shaped second bus bar, which are electrically conductively connected directly to the heating layer over the entire strip length. In a method for producing the transparent pane the zone heating element is electrically conductively connected directly to at least one first flat ribbon cable and to at least one second flat ribbon cable in an electrical parallel circuit with respect to the heating field.

12 Claims, 1 Drawing Sheet

(51) Int. Cl.
  *B60S 1/02* (2006.01)
  *H05B 3/84* (2006.01)
  *H01C 17/02* (2006.01)

(52) U.S. Cl.
  CPC .. *H05B 2203/013* (2013.01); *H05B 2203/016* (2013.01); *Y10T 29/49083* (2015.01); *Y10T 29/49087* (2015.01)

(58) Field of Classification Search
  USPC ........ 219/203, 522, 543, 547, 541, 19, 544, 219/548, 219, 528; 29/611, 613; 152/171; 244/34 D; 296/84.1; 338/306, 338/307, 308, 309; 359/894, 603, 512; 428/34, 174
  See application file for complete search history.

(56) References Cited

U.S. PATENT DOCUMENTS

| | | | | |
|---|---|---|---|---|
| 5,434,384 | A * | 7/1995 | Koontz | B32B 17/10174 219/203 |
| 5,653,903 | A * | 8/1997 | Pinchok, Jr. | B32B 17/10036 219/203 |
| 6,559,419 | B1 * | 5/2003 | Sol | B32B 17/10192 219/203 |
| 6,734,396 | B2 * | 5/2004 | Sol | B32B 17/10036 219/203 |
| 7,132,625 | B2 * | 11/2006 | Voeltzel | B32B 17/10036 219/203 |
| 7,200,921 | B2 * | 4/2007 | Loibl | B32B 17/10036 219/203 |
| 7,700,901 | B2 * | 4/2010 | Busick | H05B 3/84 219/203 |
| 2004/0065651 | A1 * | 4/2004 | Voeltzel | B32B 17/10036 219/203 |
| 2005/0045613 | A1 * | 3/2005 | Maeuser | B32B 17/10036 219/203 |
| 2005/0089691 | A1 | 4/2005 | Noguchi et al. | |
| 2010/0270280 | A1 * | 10/2010 | Blanchard | B32B 17/10036 219/203 |
| 2012/0103961 | A1 | 5/2012 | Offermann et al. | |

FOREIGN PATENT DOCUMENTS

| | | | |
|---|---|---|---|
| DE | 102007008833 A1 * | 8/2008 | ....... B32B 17/10036 |
| DE | 10 2007 050286 | 4/2009 | |
| DE | 10 2008 018147 | 10/2009 | |
| DE | 10 2008 029986 | 1/2010 | |
| EP | 0 155 614 A2 | 9/1985 | |
| EP | 0524537 A2 | 1/1993 | |
| JP | H0559918 U | 8/1993 | |
| JP | H05193355 A | 8/1993 | |
| JP | H06302375 A | 10/1994 | |
| JP | H093 U | 1/1997 | |
| JP | H0986965 A | 3/1997 | |
| JP | 2000235889 A | 8/2000 | |
| JP | 2008056225 A | 3/2008 | |
| WO | 03/055821 A1 | 7/2003 | |
| WO | 2007/015861 A2 | 2/2007 | |
| WO | 2008/090183 A1 | 7/2008 | |
| WO | 2011/006743 A1 | 1/2011 | |

OTHER PUBLICATIONS

PCT International Search Report dated May 15, 2012 for PCT/EP2012/052141 filed Feb. 8, 2012 in the name of Saint-Gobain Glass France (German & English Translation).

* cited by examiner

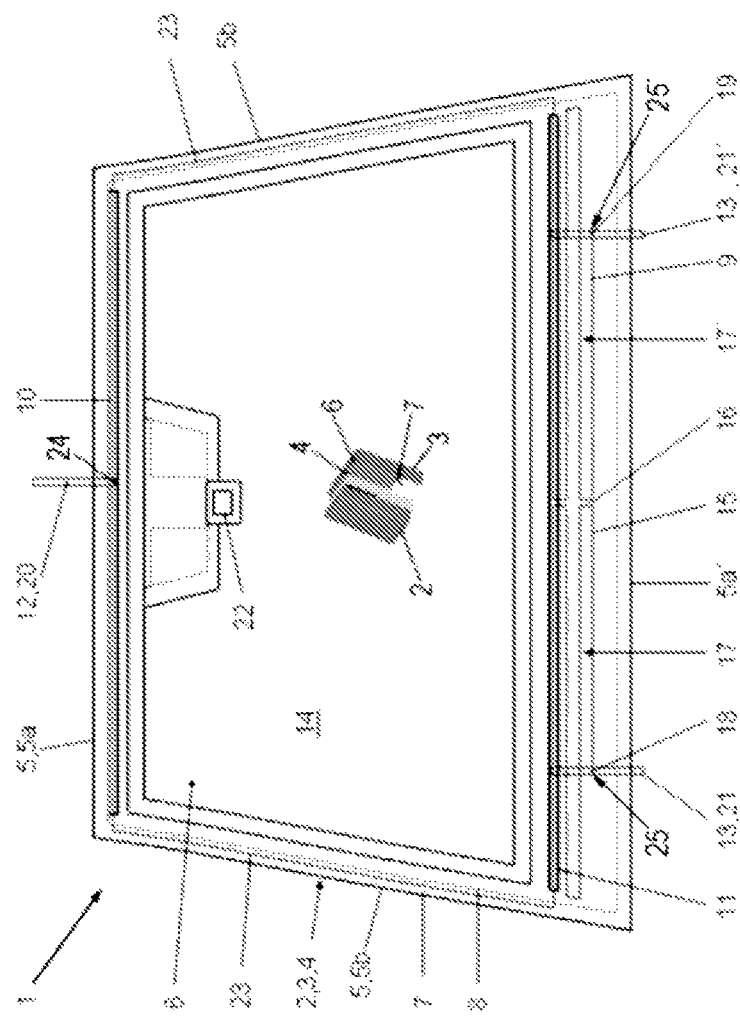

TRANSPARENT PANE WITH AN ELECTRICAL HEATING LAYER, AND PRODUCTION PROCESS THEREFOR

CROSS REFERENCE TO RELATED APPLICATIONS

The present application is the U.S. national stage of International Patent Application PCT/EP2012/052141 filed on Feb. 8, 2012 which, in turn, claims priority to European Patent Application EP 11154735.2 filed on Feb. 16, 2011.

The invention is in the area of pane technology and relates to a transparent pane with an electrical heating layer, as well as a method for production thereof.

Transparent panes with an electrical heating layer are well-known per se and have already been described many times in the patent literature. Merely by way of example, reference is made in this regard to the German published patent applications DE 10200705286, DE 102008018147 A1, and DE 102008029986 A1. In motor vehicles, they are frequently used as windshields since the central visual field must, by law, have no substantial vision restrictions. By means of the heat generated by the heating layer, condensed moisture, ice, and snow can be removed in a short time.

The heating current is usually introduced into the heating layer by at least one pair of strip- or band-shaped electrodes. As bus bars, these should introduce the heating current into the heating layer as uniformly as possible and distribute it widely. The electrical sheet resistance of the heating layer is, in the case of the materials currently used in industrial series production, relatively high and can be on the order of several ohms per square. In order to nevertheless obtain adequate heating output, the supply voltage must be correspondingly high, but, for example, in motor vehicles, standardly, only an onboard voltage of 12 to 24 volts is available. Since the sheet resistance of the heating layer increases with the length of the current path of the heating current, the bus bars of opposite polarity should have the least possible distance between them. In the case of motor vehicle panes, which are usually wider than they are high, the bus bars are, consequently, disposed along the two longer edges of the panes such that the heating current can flow via the shorter path of the height of the pane. This design results, however, in the fact that the region of a resting or parked position of windshield wipers provided to wipe the pane customarily lies outside the heating field such that no adequate heating output remains present there and the wipers can freeze in place.

The European patent application EP 0524537 A2 presents a windshield provided with an electrical heating layer, wherein, in the region of wiper storage, two flat heating strips are provided as heating elements. The heating strips are, in each case, electrically connected, via a lower bus bar, disposed adjacent the lower edge of the pane, to one terminal and, via a lead wire, to the other terminal of a power source. It is disadvantageous in this arrangement that the lower bus bar is additionally loaded with the current for the two heating strips.

The German patent application DE 102007008833 A1 presents an electrically heatable windshield, which is additionally heatable in the region of wiper storage. For this purpose, heating wires that are connected to a lower bus bar as a ground connector are provided. The heating wires are supplied power independently of the heating of the pane in the visual field. In this arrangement as well, the lower bus bar is additionally loaded with the current for the heating wires.

In contrast, the object of the present invention consists in advantageously improving transparent panes with an electrical heating layer. This and other objects are accomplished according to the proposal of the invention by a transparent pane with the characteristics of the independent claim. Advantageous embodiments of the invention are indicated by the characteristics of the subclaims.

According to the invention, a transparent pane with an electrically heatable, transparent layer (referred to in the following as "heating layer") is presented, which is designed in particular as a windshield of a motor vehicle. The heating layer extends at least over a substantial part of the pane surface, in particular over its (central) visual field and can be electrically connected by electrical connection means to a power source. The connection means have external connectors that are provided for connection with the two terminals of a power source. In addition, the connection means include at least two connection electrodes, which serve to introduce a heating current into the heating layer and are electrically conductively connected directly to the heating layer such that after application of the supply voltage, a heating current flows over a heating field formed by the heating layer. In the context of the present invention, the term "heating field" refers to that region of the heating layer that is directly heatable by a heating current that is generated by application of a supply voltage to the connection electrodes.

The connection electrodes are designed in the form of strip or band electrodes ("bus bars"), in order, as bus bars, to introduce the heating current widely distributed into the heating layer. Thus, in the pane according to the invention, a band-shaped first bus bar and a band-shaped second bus bar are provided, which are, in each case, electrically conductively connected directly over the full strip length (i.e., over the full length of the bus bar in the long direction) directly to the heating layer. For this purpose, the two band-shaped bus bars are applied completely on the heating layer, for example, by printing in the (screen) printing method, but with it also sufficing in principle for each bus bar to be applied on the heating layer in a connection section extending along the full length of the bus bar. The bus bars thus have, in each case, a contact region that extends over the complete strip length and makes direct electrical contact with the heating layer. Compared to the high-ohmic heating layer, the bus bars have a relatively small or low-ohmic electrical resistance such that they themselves contribute virtually nothing to the electrical heating. In the windshield of a motor vehicle, the first bus bar is disposed adjacent the upper edge of the pane; the second bus bar, adjacent the lower edge of the pane such that the two bus bars run in the transverse direction of the pane or the motor vehicle.

Since the bus bars in the pane according to the invention are, in each case, connected electrically conductively over their entire length directly to the heating layer, the bus bars run only in the transverse direction of the pane. Thus, no bus bars are connected to the two side edges of the pane, in particular in an edge region of the pane that is coating-free or coated with the heating layer but galvanically separated from the heating field. Because of the fact that no bus bars are provided on the side edges of the pane, an increase in the electrical resistance of the bus bars and an associated electrical power loss can advantageously be avoided. From a process technology standpoint, it is advantageous for the bus bars to be printed by (screen) printing because since no bus bars are provided in the side edges of the pane, weakening of the pane due to printing of the bus bars can be avoided.

The pane has, as additional connection means, flat ribbon cables (e.g., strip-shaped metal foils), which are electrically conductively connected to the bus bars in direct contact. Thus, the first bus bar is electrically conductively connected directly to at least one first flat ribbon cable and the second bus bar is electrically conductively connected directly to at least one second flat ribbon cable. For example, the flat ribbon cables are, for this purpose, applied on a connection section on the respective bus bar. The flat ribbon cables thus have, in each case, a contact region, which directly contacts the associated bus bar electrically conductively.

The pane according to the invention also has at least one heating-field-free pane zone, which cannot be heated directly by the heating current introduced into the heating layer via the bus bars. In particular, the heating-field-free pane zone can be a heating-layer-free pane zone that can be formed, for example, by subsequent removal of the heating layer or by masking during application of the layer. Alternatively, it is also possible for the heating layer to, in fact, be situated in the heating-field-free pane zone with the heating layer not able to be impinged on by the supply voltage and not able to be flowed through by the heating current (i.e., not directly heatable).

At least one electrically heatable heating element (referred to in the following as "zone heating element") is disposed in the heating-field-free pane zone, which heating element serves for ohmic heating and has an ohmic resistance such that the heating-field-free pane zone is electrically heatable by application of the same supply voltage as to the heating layer. It is essential here that the zone heating element is electrically connected to the electrical connection means of the heating layer in an electrical parallel circuit with respect to the heating field. The zone heating element is, for this purpose, electrically conductively connected to the at least one first flat ribbon cable, which electrically conductively contacts the first bus bar in direct contact, and to the at least one second flat ribbon cable, which electrically conductively contacts the second bus bar directly. The zone heating element is thus not directly electrically conductively connected to the bus bars.

The zone heating element can be supplied via the flat ribbon cable with the same supply voltage as the heating layer such that, advantageously, it is possible to do without separate external connectors. In addition, due to the fact that the zone heating element is not directly electrically conductively connected to the bus bars, it can advantageously be avoided for the bus bars to be subjected to an additional electrical loading by the current of the zone heating element. Instead, the current for the zone heating element is fed directly from the flat ribbon cable into the zone heating element, bypassing the bus bar. Advantageously, the pane can be heated with particularly high efficiency since the current for the zone heating element is not guided into the bus bars such that associated, relatively high electrical losses can be avoided.

When the pane according to the invention is implemented as a motor vehicle windshield, the heating-field-free pane zone, but not necessarily the heating-layer-free pane zone, can, for example, be a communication window permeable to electromagnetic signals or the region of a resting or parked position of windshield wipers provided to wipe the pane. In particular, in the latter case, the pane according to the invention makes it possible, particularly advantageously, that a separate electrical line to the zone heating element is not necessary.

In the pane according to the invention, the zone heating element is electrically conductively connected directly via connection sections to the first and/or second flat ribbon cable. Here, it can, in particular, be advantageous from a production technology standpoint for the connection sections to be disposed, at least in regions, in physical contact with the heating layer, in particular with the heating field, with at least the regions of the connection sections disposed in physical contact with the heating layer or the heating field provided with a sheathing electrically insulating against the environment. Such sheathing can, for example, be implemented in the form of a polyurethane coating. It is also equally possible for the connection sections to be disposed at least partially in a heating-layer-free or heating-field-free edge zone of the pane. In the latter case, it is possible to do without an electrically insulating sheathing of the connection sections.

In a particularly advantageous embodiment of the pane according to the invention, it is implemented as a composite pane with two individual panes bonded to each other by a thermoplastic adhesive layer, with the heating layer disposed on at least one surface of the individual panes and/or situated on a surface of a carrier disposed between the individual panes. The zone heating element is disposed between the two individual panes and can be embedded, in particular, at least by sections, in the adhesive layer to achieve a particularly simple and reliable fixing of the zone heating element. It is understood that the two individual panes need not absolutely be made of glass but that they can also be made of a non-glass material, for example, plastic. In particular, the zone heating element can be situated on one and the same side of the composite pane (for example, "side 3") as the heating layer, in other words, in particular, also on one and the same side of the adhesive layer. Alternatively, it would be equally possible for the zone heating element and the heating layer to be situated on different sides of the adhesive layer.

In another advantageous embodiment of the pane according to the invention, the at least one zone heating element is designed in the form of a, for example, metal heating wire or heating foil, which enables a particularly simple and economical technical implementation. Preferably, the heating wire has a diameter in the range from 35 to 150 µm and is designed such that it has ohmic resistance in the range from 0.1 to 1 ohm/m such that, in particular, with a supply voltage in the range from 12 to 24 volts, a desired heating output can be obtained. Preferably, the heating wire is designed such that it can make available, for example, with a supply voltage in the range from 12 to 24 volts, a heating output in the range from 300 to 1000 W/m$^2$ of pane surface. For the case in which the heating wire has at least one curved wire section, it is preferable for the curved wire section to have a radius of curvature of more than 4 mm such that the practical manageability during laying is improved and the risk of breakage is reduced.

In industrial series production, a zone heating element implemented as a heating wire can be laid in a technically particularly simple and economical manner. For this purpose, it is possible to use a guide head movable substantially in one plane for the heating wire, which is coupled to a heated pressing roller such that the heating wire is pressed into the adhesive layer for the bonding of the two individual layers. By means of the heated pressing roller, a local softening of the adhesive layer can be obtained.

In one embodiment of the pane according to the invention as a motor vehicle windshield, it is advantageous for the zone heating element to be disposed overlapping a bus bar disposed adjacent a lower edge of the pane. By means of this measure, it is advantageously possible to achieve heating of the pane even in the region of the lower bus bar. The lower bus bar usually has only a very low ohmic heating output and lies outside the heating field. Thus, it is possible, even in this strip-shaped region of the pane to reliably and safely remove a layer of ice or snow.

The invention further extends to a method for producing a transparent pane with an electrical heating layer, which extends at least over a substantial part of the pane surface and can be electrically connected via electrical connection means to a power source, wherein the connection means comprise a strip-shaped first bus bar and a strip-shaped second bus bar, which, in each case, are electrically conductively connected directly to the heating layer over the entire strip length such that after application of a supply voltage, a heating current flows over a heating field formed by the heating layer, wherein the first bus bar is electrically conductively connected directly to at least one first flat ribbon cable and the second bus bar is electrically conductively connected directly to at least one second flat ribbon cable, and wherein the pane has at least one heating-field-free pane zone. In the method, at least one electrical zone heating element, which has an ohmic resistance such that the heating-field-free pane zone is heatable by applying the supply voltage, is disposed in the heating-field-free pane zone; and the zone heating element is electrically conductively connected directly to the at least one first flat ribbon cable in an electrical parallel circuit with respect to the heating field and to the at least one second flat ribbon cable. In an advantageous embodiment of the method, the zone heating element is disposed at least by sections in physical contact with, but electrically insulated against, the heating layer. From a process technology standpoint, it is advantageous for the zone heating element to be laid in the form of a one-piece heating wire.

In addition, the invention extends to the use of a transparent pane as described above as a functional individual piece and as a built-in part in furniture, devices, and buildings, as well as in means of transportation on land, in the air, or on water, in particular in motor vehicles, for example, as a windshield, rear window, side window, and/or glass roof.

It is understood that the different embodiments can be realized singly or in any combinations. In particular, the aforementioned characteristics and those to be explained in the following can be used not only in the combinations indicated, but also in other combinations or alone, without departing from the scope of the present invention.

BRIEF DESCRIPTION OF THE DRAWING

The invention is now explained in detail using an exemplary embodiment with reference to the accompanying FIGURE. It depicts, in a simplified, not-to-scale representation, a schematic view of one exemplary embodiment of the pane according to the invention in an embodiment as a motor vehicle windshield.

DETAILED DESCRIPTION OF THE DRAWING

In the accompanying FIGURE, the pane according to the invention is embodied, for example, in the form of a motor vehicle windshield referred to as a whole by the reference character 1. The windshield 1 is implemented as a composite pane, which (as can be discerned from the interposed cross-sectional depiction) comprises a rigid outer pane 2 and a rigid inner pane 3, both implemented as individual panes and bonded to each other by means of a thermoplastic adhesive layer 4, here, for example, a polyvinyl butyral film (PVB), ethylene vinyl acetate film (EVA), or polyurethane film (PU). The basic structure of such a composite pane is well known to the person skilled in the art, for example, from the industrial series production of motor vehicles, such that there is no need to discuss it here in detail. The two individual panes 2, 3 are approximately the same size, have a roughly trapezoidal curved contour, and are, for example, made of glass, with it being equally possible to make them from a non-glass material, such as plastic. For an application other than as a windshield, it is also possible to make the two individual panes 2, 3 from a flexible material.

The contour of the windshield 1 is defined by an edge of the pane 5, which is, corresponding to the trapezoidal shape, composed of two long side edges 5a, 5a' (top and bottom in the installation position) and two short side edges 5b, 5b' (left and right in the installation position). A transparent heating layer 6, which serves to electrically heat the windshield 1, is deposited on the side of the inner pane 3 ("side 3") bonded to the adhesive layer 4. The heating layer 6 is applied substantially over the entire surface of the inner pane 3, with a circumferential edge strip 7 on all sides of the inner pane 3 not coated such that a heating layer edge 8 is set back inward relative to the edge of the pane 5. This measure serves for electrical insulation of the heating layer 6 against the outside. Moreover, the heating layer 6 is protected against corrosion penetrating from the edge of the pane 5.

The heating layer 6 comprises, in a manner known per se, a layer sequence with at least one electrically conductive metallic sublayer, preferably silver, and, optionally, other sublayers, such as anti-reflection layers and blocker layers. The layer sequence advantageously has high thermal stability such that it withstands, without damage, the temperatures of typically more than 600° C. necessary for the bending of glass panes; however, layer sequences with low thermal stability can also be provided. Instead of being applied directly on the inner pane 3, it could, for example, also be applied on a plastic film that is subsequently glued to the outer and inner pane 2, 3. The heating layer 6 is, for example, applied by sputtering (magnetron cathode sputtering). The sheet resistance of the heating layer 6 is, for example, in the range from 0.1 to 6 ohm/square. The heating layer 6 is electrically conductively connected directly to a (top) first bus bar 10 and to a (bottom) second bus bar 11. The two bus bars 10, 11 are, in each case, implemented band- or strip-shaped and serve as connection electrodes for the broad introduction of a supply current into the heating layer 6. For this purpose, the bus bars 10, 11 are disposed on the heating layer 6, with the first bus bar 10 extending along the upper long edge of the pane 5a and the second bus bar 11 extending along the lower long edge of the pane 5a'. The two bus bars 10, 11 are thus electrically conductively connected directly to the heating layer 6 along their full strip length and make contact with the heating layer 6, in each case, in a contact region situated on their underside. The two bus bars 10, 11 run exclusively along the long edges 5a, 5a' of the pane, but not along the short edges 5b, 5b' of the pane. The two bus bars 10, 11 are made of one and the same material and can, for example, be produced by printing a paste on the heating layer 6, for example, in the screen printing method. Alternatively, it would also be possible to make the bus bars 10, 11 from narrow metal foil strips, for example, of copper or aluminum. These can, for example, be fixed on the adhesive layer 4 and be disposed on the heating layer 6 at the time of the bonding of the outer and inner pane 2, 3. An electrical contact can be ensured through the action of heat and pressure at the time of the bonding of the individual panes. Merely for the sake of completeness, reference is made to the fact that the uppermost layer of the heating layer 6 can be made from an electrically insulating material. When the bus bars 10, 11 are printed on, slight etching of the heating layer 6 for making electrical contact can be achieved, for example, by glass frits in the printing paste. When the bus bars 10, 11 are applied as metal foil strips, the uppermost layer made of insulating material of the heating layer 6 can be locally removed, for example, by a soldering iron.

A first connection lead 12 that is implemented as a flat ribbon cable (e.g., narrow metal foil) is electrically conductively connected in direct contact to the first bus bar 10, and has a first external connector 20 that is provided for connection with a terminal (for example, a negative terminal) of a power source to make a supply voltage available. The first connection lead 12 is disposed roughly in the center of the upper long edge of the pane 5a perpendicular to the first bus bar 10. Two second connection leads 13, 13' are electrically conductively connected in direct contact with the second bus bar 11, which conductors are also implemented, in each case, as flat ribbon cables (e.g., narrow metal foils) and have, in each case, a second external connector 21, 21', which are provided for connection to another terminal (for example, a negative terminal) of the power source. The two second connection leads 13, 13' are disposed perpendicular to the second bus bar 11 at a distance on both sides of the central region 16 of a heating-field-free zone 9 explained in the following. The connection leads 12, 13, 13' make contact with the associated bus bar 10, 11, in each case, in a contact region situated on its underside.

A heating field 14, in which a heating current flows upon application of a supply voltage, is enclosed by the two bus bars 10, 11. Because of an ohmic resistance negligible compared to the heating layer 6, the bus bars 10, 11 virtually do not heat up and make no appreciable contribution to the heating output.

As has already been explained in the introduction, the sheet resistance of the heating layer 6 increases with the length of the current path of the heating current such that it is advantageous with regard to a satisfactory heating output for the two bus bars 10, 11 to have the smallest possible distance between them. For this reason, it is useful to implement a lower pane region, which is no longer part of the visual field but corresponds to the region of a resting or parked position of windshield wipers provided to wipe the pane, as a heating-field-free zone 9. Nevertheless, the heating layer 6 is situated in the heating-field-free zone 9, which is, however, not situated between the two bus bars 10, 11, can not be flowed through by the heating current and is thus not directly heatable.

In order to heat the heating-field-free zone 9, it has a heating wire 15 that serves as an electrically heatable zone heating element. The heating wire 15 is surrounded by an electrically insulating sheathing, for example, a polyurethane varnish. The heating wire 15 forms two heating zones 17, 17' that are situated on both sides of the central region 16 and are defined by a meandering curved course of the heating wire 15. The meandering curved course of the heating wire 15 serves for at least approximately aereal heating of the heating-field-free Zone 9. A first wire end 18 of the heating wire 15 is electrically conductively connected in direct contact with one (left, in the FIGURE) second connection lead 13, while its second wire end 19 is electrically conductively connected in direct contact with the other (right, in the FIGURE) second connection lead 13'. Specifically, the heating wire 15 has, starting from its first wire end 18 in one heating zone 17, a meandering curved course, without crossing the central region 16, being disposed roughly over half the length of the bus bar above or on the lower or second bus bar 11, it extends then in the heating-layer-free edge strip 7 along the left short edge of the pane 5b, extends further over the entire bus bar length above or on the upper or first bus bar 10 along the upper long edge of the pane 5a, and extends in the heating-layer-free edge strip 7 along the right short edge of the pane 5b', to then again assume, in the other heating zone 17', a meandering curved course, without crossing the central region 16, extending roughly over half the length of the bus bar above or on the lower or second bus bar 11, and finally ends in the second wire end 19. In this, the heating wire 15 has on the upper long edge of the pane 5a, in one contact spot, a direct electrical contact with the first connection lead 12; however, because of the electrical sheathing, has no direct electrical contact with the first bus bar 10. For a direct electrical contact between heating wire 15 and a first connection lead 12 in a first contact spot 24, the electrically insulating sheathing of the heating wire 15 is locally removed in the region of the first connection lead 12, which can be achieved in series production, for example, by applying a soldering iron for removal of the varnish layer. Analogously, the electrical sheathing of the heating wire 15 is removed at the two second connection leads 13, 13' to form a respective second contact spot 25. Otherwise, the heating wire 15 is completely surrounded by an insulating varnish layer.

Thus, connection sections 23 of the heating wire 15 situated outside the two heating zones 17, 17' serve for the electrical connection to the first connection lead 12. By application of a supply voltage on the two bus bars 10, 11, the heating field 14 and the heating wire 15 can be thus simultaneously heated, with the bus bar 10, 11 not loaded with the current of the heating wire 15. Instead, the current is introduced, for example, by the first connection lead 12 directly into the heating wire 15, is distributed there to parallel current paths in the heating wire 15, and is guided out again on the two second connection leads 13, 13'. Thus, the two bus bars 10, 11 are not loaded by the heating current for the heating wire 15, such that additional electrical losses can be advantageously avoided.

The heating wire 15 is preferably, but not mandatorily, made of a metallic material, in particular copper or tungsten. The heating wire 15 has, for example, a diameter in the range from 35 to 150 μm, such that it has ohmic resistance in the range from 0.1 ohm to 1 ohm/m, which has suitable heating output for practical use with the customary onboard voltage of a motor vehicle of 12 to 24 V. Preferably, a heating output in the range from 300 to 1000 W/m$^2$ of pane surface can be made available. In the curved sections, it is preferable for the heating wire 15 to have a minimum radius of curvature of 4 mm, by means of which simple laying can be achieved.

Although this is not depicted in the FIGURE, it would be equally possible for the heating wire 15 to run outside the two heating zones 17, 17' at least in sections on the heating layer 6 in physical contact therewith. The heating wire 15 is disposed, in this case, for example, on the same side of the adhesive layer 4 as the heating layer 6, but could also be disposed on the other side of the adhesive layer 4. It would likewise be possible for the heating wire 15 to form only one single heating zone, with the meandering curved course extending beyond the central region 16 or divided into two electrically separated sections. The one-piece or one-part heating wire 15 forms a continuous conductor loop, by means of which a particularly simple and economical laying of the wire is made possible from a process technology standpoint. Instead of two second connection leads 13, 13', only one single second connection lead, which is disposed, for example, in the center of the second bus bar 11, could equally possibly be provided.

As depicted in FIG. 1, the windshield further includes a communication window 22, which is designed as another heating-field-free zone 9. The communication window 22 serves for communication with the external environment and is, for this purpose, permeable to electromagnetic waves. The precise function of the communication window 22 is not relevant for the understanding of the invention such that it need not be discussed in detail here. It is understood that a heating wire that can be electrically conductively connected in direct contact with the connection leads 12, 13, 13' of the heating layer 6 can be disposed analogously in the communication window 22, in order to heat the communication window directly.

In the FIGURE, the zone heating element is embodied, by way of example, in the form of a heating wire 15, with it being equally possible to produce the zone heating element from a narrow metal foil strip, which can, for example, be fixed on the adhesive layer 4.

In the following, a production method for the windshield 1 is described, by way of example, in its essential steps:

First, the outer and inner pane 2, 3 are cut in the desired trapezoidal contour from a glass blank. Then, the inner pane 3 is coated with the heating layer 6 by sputtering, with the edge strip 7 not coated, through the use of a mask. It would also be possible for the lower pane region serving as a resting or parked position for the windshield wipers not to be coated. Alternatively, it would also be possible to first coat a glass blank from which the inner pane 3 is then cut. The inner pane 3 preprocessed in this manner is decoated to form the communication window 22, which can be done in series production using, for example, a mechanically stripping grinding wheel. Alternatively, the edge region 7, and possibly the lower pane region serving as a resting or parked position for the windshield wipers, could also be produced by decoating. Then, the two bus bars 10, 11 are printed on the inner pane 3, for example, in the screen printing method. A silver printing paste, for example, can be used as printing paste. Then, the printing paste is baked in advance, followed by bending of the panes 2, 3 at a high temperature, as well as gluing and soldering of the connection leads, as well as placing the outer and inner pane 2, 3 together and bonding them by means of the adhesive layer 4.

Before placing the outer and inner pane 2, 3 together, the heating wire 15 can be pressed, for example, by means of an application head of pressing tool into the adhesive layer 4, with the heating wire 15, in particular, possibly heated to effect thermal fixing in the adhesive layer 4 in a simple manner based on a comparatively low melting point of, for example, PVB. Alternatively, it would also be possible, to provide a groove for the heating wire 15 in the adhesive layer 4 and to lay it therein. The heating wire 15 is, for this purpose, in a practical manner rolled on a spool such that it can be gradually fed by rolling off. An electrical connection with the first and second connection leads 12, 13, 13' can be made, for example, by soldering or fixing by means of a conductive adhesive, for example, in the ultrasonic welding process. For the case in which the heating wire 15 is shielded by an insulating varnish layer, an electrical connection with the connection leads 12, 13, 13' can be made in a simple manner with a soldering iron, with the varnish layer removed through the action of high temperatures.

The invention makes available a transparent pane with an electrical heating layer, in which at least one zone heating element, which is connected to the foil conductor electrically connected to the bus bars, is disposed in at least one heating-field-free pane zone. It is advantageously possible to do without separate external conductors for the zone heating element.

LIST OF REFERENCE CHARACTERS 1 windshield
2 outer pane
3 inner pane
4 adhesive layer
5 edge of the pane
5a, 5a' long edge of the pane
5b, 5b' short edge of the pane
6 heating layer
7 edge strip
8 heating layer edge
9 heating-field-free zone
10 first bus bar
11 second bus bar
12 first connection lead
13, 13' second connection lead
14 heating field
15 heating wire
16 central region
17, 17' heating zone
18 first wire end
19 second wire end
20' first external connector
21, 21' second external connector
22 communication window
23 connection section
24 first contact spot
25, 25' second contact spot

The invention claimed is:

1. A transparent pane comprising:
an electrical heating layer, which extends at least over a part of a transparent pane surface connectable via connection means to a power source, wherein the connection means comprise a strip-shaped first bus bar and a strip-shaped second bus bar, which are respectively electrically conductively connected directly to the electrical heating layer over an entire strip length such that after application of a supply voltage, a heating current flows over an electrical heating field formed by the electrical heating layer, wherein the strip-shaped first bus bar is electrically conductively connected in direct contact to at least one first flat ribbon cable and the strip-shaped second bus bar is electrically conductively connected in direct contact to at least one second flat ribbon cable, wherein the at least one first flat ribbon cable and the at least one second flat ribbon cable are connected to a same supply voltage of the power source, and
at least one heating-field-free pane zone, in which at least one electrical zone heating element is disposed, which has an ohmic resistance such that the heating-field-free pane zone is heatable by applying the supply voltage, wherein the electrical zone heating element is electrically conductively connected in direct contact to the at least one first flat ribbon cable and to the at least one second flat ribbon cable in an electrical parallel circuit with respect to the electrical heating field, wherein:
the electrical zone heating element is not directly electrically conductively connected to both the strip-shaped first bus bar and the strip-shaped second bus bar,
the at least one electrical zone heating element is formed from a one-piece heating wire, the electrical zone heating element is powered by an electrical current directly through the at least one first flat ribbon cable and the at least one second flat ribbon cable, thereby avoiding conduction of said electrical current through the strip-shaped first bus bar and the strip-shaped second bus bar.

2. The transparent pane according to claim 1, wherein one or more connection sections are disposed, for the electrical conductive connection of the electrical zone heating element to the at least one first and the at least one second flat ribbon cables, at least by regions in physical contact with the heating layer, wherein the regions of the one or more connection sections disposed in contact with the heating layer are provided with an electrically insulating sheathing against an environment.

3. The transparent pane according to claim 1, wherein one or more connection sections are disposed, for the electrical conductive connection of the electrical zone heating element to the at least one first and the at least one second flat ribbon cable, at least by regions in a heating-layer-free edge zone of the at least one heating-field-free pane zone.

4. The transparent pane according to claim 1, wherein the transparent pane is implemented as a composite pane with two individual panes bonded to each other by a thermoplastic adhesive layer, wherein the heating layer is situated on at least one surface of the two individual panes or on a surface of a carrier arranged between the two individual panes, or both on at least one surface of the two individual panes and a surface of a carrier arranged between the two individual panes, and wherein the at least one electrical zone heating element is disposed between the two individual panes.

5. The transparent pane according to claim 4, wherein the at least one electrical zone heating element is embedded at least by sections in the thermoplastic adhesive layer.

6. The transparent pane according to claim 1, wherein the heating wire has a diameter in the range from 35 μm to 150 μm.

7. The transparent pane according to claim 1, wherein the heating wire has at least one curved wire section, wherein the curved wire section has a radius of curvature of more than 4 mm.

8. The transparent pane according to claim 1, wherein the transparent pane is implemented as a motor vehicle windshield, and wherein the at least one heating-field-free pane zone serves as a resting or parked position of windshield wipers provided to wipe the transparent pane.

9. The transparent pane according to claim 8, wherein the electrical zone heating element is disposed overlapping the second strip-shaped bus bar disposed adjacent a lower edge of the transparent pane.

10. The transparent pane according to claim 1, wherein the heating wire is designed such that with the supply voltage in the range from 12 volts to 24 volts, a de-icing power in the range from 300 $W/m^2$ to 1000 $W/m^2$ of pane surface is made available.

11. A method for producing a transparent pane comprising:

electrically connecting via connection means an electrical heating layer, which extends at least over a part of a transparent pane surface, to a power source, wherein the connection means comprise a strip-shaped first bus bar and a strip-shaped second bus bar, which are respectively electrically conductively connected in direct contact to the electrical heating layer over an entire strip length such that after application of a supply voltage, a heating current flows over a heating field formed by the electrical heating layer, wherein the strip-shaped first bus bar is electrically conductively connected in direct contact to at least one first flat ribbon cable and the strip-shaped second bus bar is electrically conductively connected in direct contact to at least one second flat ribbon cable, implementing a heating-field-free pane zone whereby at least one electrical zone heating element, which has an ohmic resistance such that the heating-field-free pane zone is heatable by applying the supply voltage, wherein the at least one electrical zone heating element is laid in the form of a one-piece heating wire, and electrically conductively connecting the at least one electrical zone heating element directly to the at least one first flat ribbon cable and to the at least one second flat ribbon cable in an electrical parallel circuit with respect to the heating field, wherein the electrical zone heating element is not directly electrically conductively connected to the first bus bar and the second bus bar, wherein the at least one electrical zone heating element is powered by an electrical current directly through the at least one first flat ribbon cable and the at least one second flat ribbon cable, thereby avoiding conduction of said electrical current through the strip-shaped first bus bar and the strip-shaped second bus bar.

12. The method according to claim 11, wherein the at least one electrical zone heating element is disposed at least by sections in physical contact with, but electrically insulated against, the heating layer.

* * * * *